United States Patent
Hsieh et al.

(10) Patent No.: US 8,170,559 B1
(45) Date of Patent: *May 1, 2012

(54) COMMUNICATION SERVICE HANDOVER PROCESSING SYSTEM FOR FEMTOCELLS AND METHOD THEREOF

(75) Inventors: Ching-Feng Hsieh, Wanhua District (TW); Kuo-Wei Hung, Sanmin District (TW)

(73) Assignee: Askey Computer Corporation, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/965,443

(22) Filed: Dec. 10, 2010

(30) Foreign Application Priority Data

Nov. 5, 2010 (TW) .............................. 99138066 A

(51) Int. Cl.
*H04Q 7/70* (2006.01)
(52) U.S. Cl. .................... 455/436; 455/437; 370/331
(58) Field of Classification Search .................. 455/436, 455/437; 370/331
See application file for complete search history.

(56) References Cited

U.S. PATENT DOCUMENTS

| | | | |
|---|---|---|---|
| 2009/0125630 A1* | 5/2009 | Gogic | 709/227 |
| 2009/0286510 A1* | 11/2009 | Huber et al. | 455/410 |
| 2010/0027510 A1* | 2/2010 | Balasubramanian et al. | 370/332 |
| 2010/0298008 A1* | 11/2010 | Burroughs | 455/456.1 |

* cited by examiner

*Primary Examiner* — Charles Shedrick
(74) *Attorney, Agent, or Firm* — Steptoe & Johnson LLP

(57) ABSTRACT

A method for processing handover of a mobile communication device between femtocell base stations, includes: setting communication alert value and signal capture time period; detecting the signal strength of the femtocell base station currently serving the mobile communication device, and when the detected signal strength is less than the communication alert value, performing a timing operation to continuously capture the signal strength of the serving femtocell base station and other femtocell base stations that allow the mobile communication device to access thereto until the elapsed time measured through the timing operation reaches the signal capture time period, and creating a priority list according to the signal strength of said other femtocell base stations; and choosing the femtocell base station with highest priority as a handover target when the signal strength of the serving femtocell base station is less than that of the femtocell base station with highest priority.

10 Claims, 2 Drawing Sheets

COMMUNICATION SERVICE HANDOVER PROCESSING SYSTEM FOR FEMTOCELLS AND METHOD THEREOF

This application claims priority to Taiwanese Application No. 99138066, filed on Nov. 5, 2010, which is incorporated by reference in its entirety.

BACKGROUND OF THE INVENTION

1. Field of the Invention

The present invention relates to handover techniques in the field of wireless communication, and more particularly, to a system and method for processing handover of a mobile communication device between femtocell base stations.

2. Description of Related Art

In the development of network communications, network coverage has long been a focus of concern for communication service providers and an important factor considered by users when choosing communication service providers. Currently, the coverage of wide area networks is quite stable. For example, the coverage of macrocell base stations can reach sparsely populated regions and fast moving users and even reach remote villages.

But in buildings of densely populated cities, the macrocell coverage is quite poor. Therefore, femtocell base stations are developed to extend the coverage of mobile networks so as to overcome the above-described drawback of poor indoor coverage.

As known in the prior art, handover of a mobile communication terminal such as a mobile phone between different macrocell base stations is a process of signal comparison. That is, when the mobile communication terminal detects multiple macrocell base stations in its vicinity, it tends to select the one with highest signal strength. Since the macrocell base stations are connected together through optical fibers, it leads to a high message exchange rate between the macrocell base stations and accordingly leads to a synchronous signal comparison between the macrocell base stations, thereby ensuring that the mobile communication terminal is handed over to the macrocell base station with best communication quality.

In contrary, since femtocell base stations are connected through network cables with a significantly lower signal transmission rate compared with that of the optical fibers, a synchronous signal comparison cannot be achieved between the femtocell base stations. A femtocell base station performing a signal strength comparison cannot timely capture a signal reference value (signal strength) from another femtocell base station, which leads to an uncertainty in the comparison result such that the mobile communication terminal may be handed over to a femtocell base station with poor signal strength.

SUMMARY OF THE INVENTION

Accordingly, the present invention provides a system and method for processing handover of a mobile communication device between femtocell base stations so as to overcome the conventional drawback of uncertain comparison results due to inability to timely capture the signal strength of femtocell base stations.

In order to achieve the above and other objects, an aspect of the present invention provides a system for processing communication service handover of a mobile communication device between femtocell base stations through a network device, which comprises: a database for storing a permission list containing at least one of the femtocell base stations that allows the mobile communication device to access thereto in the coverage of the femtocell base stations; a setting module for setting a communication alert value and a signal capture time period; a detection module for detecting the signal strength of the femtocell base station currently connected to the mobile communication device, and performing a timing operation according to the signal capture time period when the detected signal strength is less than the communication alert value; a capturing module for continuously capturing the signal strength of the femtocell base station currently connected to the mobile communication device and the other femtocell base stations in the permission list until the elapsed time measured through the timing operation reaches the signal capture time period and creating a priority list according to the signal strength of said other femtocell base stations; and a switching module for comparing the signal strength of the femtocell base station currently connected to the mobile communication device with that of the femtocell base station in the priority list so as to choose the femtocell base station with highest priority as a target femtocell base station for handover of the mobile communication device when the signal strength of the femtocell base station currently connected to the mobile communication device is less than that of the femtocell base station with highest priority.

In another aspect, the capturing module creates the priority list according to the average signal strength of said other femtocell base stations. Further, the switching module comprises a comparison unit for comparing the average signal strength of the femtocell base station currently connected to the mobile communication device with that of the femtocell base station in the priority list so as to choose the femtocell base station with highest priority as the target femtocell base station for handover of the mobile communication device when the average signal strength of the femtocell base station currently connected to the mobile communication device is less than that of the femtocell base station with highest priority.

Further, an aspect of the present invention provides a method for processing communication service handover of a mobile communication device between femtocell base stations through a network device, which comprises the steps of: creating in the network device a permission list containing at least one of the femtocell base stations that allows the mobile communication device to access thereto in the coverage of the femtocell base stations and setting a communication alert value and a signal capture time period; the network device detecting the signal strength of the femtocell base station currently connected to the mobile communication device, and when the detected signal strength is less than the communication alert value, the network device performing a timing operation according to the signal capture time period so as to continuously capture the signal strength of the femtocell base station currently connected to the mobile communication device and the other femtocell base stations in the permission list until the elapsed time measured through the timing operation reaches the signal capture time period, and creating a priority list according to the signal strength of said other femtocell base stations; and when the signal strength of the femtocell base station currently connected to the mobile communication device is less than that of the femtocell base station with highest priority in the priority list, the network device choosing the femtocell base station with highest priority as a target femtocell base station for handover of the mobile communication device.

In another aspect, the method comprises the step of creating the priority list according to the average signal strength of said other femtocell base stations. The method further comprises the step of comparing the average signal strength of the femtocell base station currently connected to the mobile communication device with that of the femtocell base station in the priority list so as to choose the femtocell base station with highest priority as the target femtocell base station for handover of the mobile communication device when the average signal strength of the femtocell base station currently connected to the mobile communication device is less than that of the femtocell base station with highest priority.

Therefore, when the signal strength of the femtocell base station currently connected to the mobile communication device is less than the preset communication alert value, the present invention compares the signal strength of the femtocell base station currently connected to the mobile communication device with other femtocell base stations that allow the mobile communication device to access thereto so as to choose the femtocell base station with highest signal strength or highest average signal strength as a handover target, thereby effectively overcoming the conventional handover difficulty due to inability to timely capture the signal reference values (signal strength) of other femtocell base stations.

DETAILED DESCRIPTION OF PREFERRED EMBODIMENTS

The following illustrative embodiments are provided to illustrate the disclosure of the present invention, these and other advantages and effects can be apparent to those in the art after reading this specification. The present invention can also be performed or applied by other different embodiments. Various modifications and variations based on different viewpoints and applications can be made in the details of the specification without departing from the spirit of the present invention.

It should be noted that the drawings are simplified schematic diagrams illustrating the basic idea of the present invention. In practice, the layout of components may be far more intricate.

Figure 1:
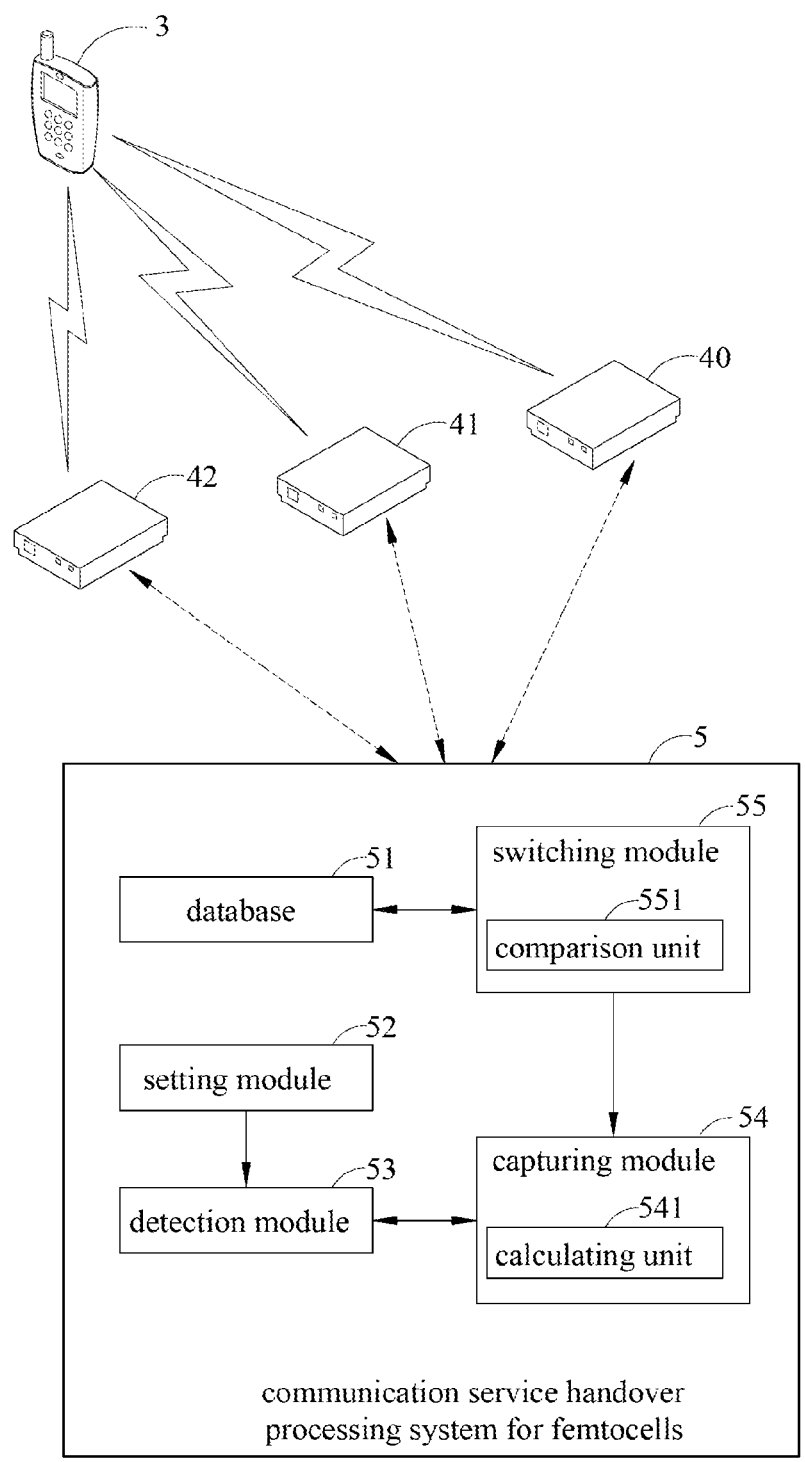
FIG. 1 is a schematic block diagram illustrating the basic architecture of a communication service handover processing system between femtocell base stations according to the present invention.

FIG. 1 is a schematic block diagram illustrating the basic architecture of a communication service handover processing system according to the present invention. Referring to FIG. 1, the system 5 is used for processing communication service handover of a mobile communication device 3 between femtocell base stations 40, 41, 42 that allow the mobile communication device 3 to access thereto and utilize communication services thereof. The system 5 can be a network device, such as a server, built up by a communication service provider for providing mobile communication services. The system 5 comprises a database 51, a setting module 52, a detection module 53, a capturing module 54 and a switching module 55.

The database 51 is used for storing a permission list containing at least one of the femtocell base stations 41, 42, 43 that allows the mobile communication device 3 to access thereto in the coverage of the femtocell base stations 41, 42, 43. In practice, the database 51 can further store cell ID and IP address of each of the femtocell base stations. In the following embodiment, it is exemplified that the femtocell base station 41 first allows the mobile communication terminal 3 to access thereto and utilize communication services thereof.

The setting module 52 is used for setting a communication alert value and a signal capture time period. The communication alert value is set according to a communication threshold value specified in base station communication standards. In particular, the communication alert value is greater than the communication threshold value so as to avoid communication interruption when the femtocell base station 41 currently connected to the mobile communication device 3 has a signal strength lower than the communication alert value. Therefore, both the communication alert value and communication threshold value are preset signal strength parameters. Since the femtocell base stations are connected together through network cables, there exists a time delay in signal comparison between the femtocell base stations. Therefore, in a preferred embodiment, the signal capture time period is greater than the length of the time delay. Particularly, the signal capture time period is the time period for capturing signal strength.

The detection module 53 is used for detecting the signal strength of the femtocell base station 41 currently connected to the mobile communication terminal 3, and performing a timing operation according to the signal capture time period when the detected signal strength is less than the communication alert value. In a preferred embodiment, the detection module 53 detects the signal strength of communication between the femtocell base station 41 and the mobile communication device 3, and when the signal strength is less than the communication alert value preset by the setting module 52, the detection module 53 starts to perform a timing operation according to the signal capture time period.

Meanwhile, the capturing module 54 continuously captures the signal strength of the other femtocell base stations 40, 42 in the permission list that allow the mobile communication device to access thereto, and a calculating unit 541 of the capturing module 54 calculates the average signal strength of the femtocell base stations 40, 42 based on the captured signal strength of the femtocell base stations 40, 42 until the elapsed time measured through the timing operation reaches the signal capture time period. Further, the capturing module 54 creates a priority list according to the average signal strength of the femtocell base stations 40, 42. For example, if the average signal strength of the femtocell base station 42 is greater than that of the femtocell base station 40, the femtocell base station 42 is set with highest priority in the priority list.

Further, the capturing module 54 continuously captures the signal strength of the femtocell base station 41 within the signal capture time period and the calculating unit 541 calculates the average signal strength of the femtocell base station 41 within the signal capture time period.

When the elapsed time measured through the timing operation of the detection module 53 reaches the signal capture time period set by the setting module 52, the timing operation is ended, and the switching module 55 compares the average signal strength of the femtocell base station 41 with that of the femtocell base stations in the priority list through a comparison unit 551. In particular, when the average signal strength of the femtocell base station 41 is less than that of the femtocell base station with highest priority in the priority list, the femtocell base station with highest priority is chosen as a target femtocell base station for handover of the mobile communication.

On the other hand, when the average signal strength of the femtocell base station 41 is greater than or equal to that of the femtocell base station with highest priority in the priority list, the mobile communication device 3 maintains the connection with the femtocell base station 41 and communicates therewith.

Therefore, before the signal strength comparison of the femtocell base station 41 with the other femtocell base stations 40, 42, the signal reference values of the femtocell base stations 40, 42 are obtained in advance so as to effectively overcome the conventional handover difficulty due to inability to timely capture the signal reference values of other femtocell base stations.

Figure 2:
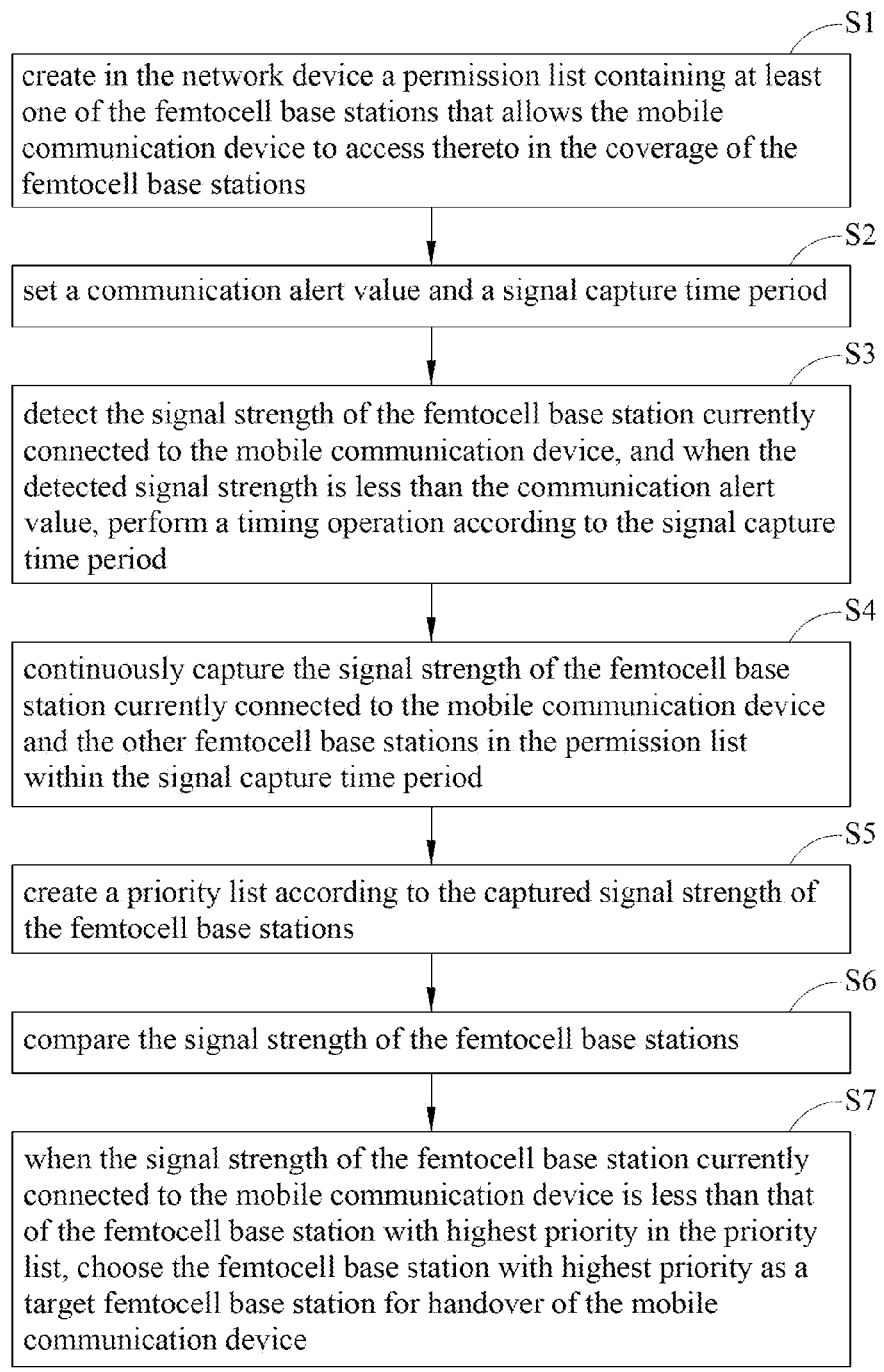
FIG. 2 is a flow diagram illustrating a communication service handover processing method between femtocell base stations according to the present invention.

FIG. 2 is a flow diagram illustrating a communication service handover processing method between femtocell base stations according to the present invention. Referring to FIG. 2, the method is used for processing communication service handover of a mobile communication device between different femtocell base stations 40, 41, 42 through a network device.

The method at least comprises the following steps.

First, at step S1, a permission list containing at least one of the femtocell base stations 41, 42, 43 that allows the mobile communication device 3 to access thereto in the coverage of the femtocell base stations 41, 42, 43 is created in the network device. Then, the process goes to step S2.

At step S2, a communication alert value and a signal capture time period are set in the network device. The communication alert value is set according to a communication threshold value specified in base station communication standards. In particular, the communication alert value is greater than the communication threshold value so as to avoid communication interruption when the signal strength of communication between the mobile communication device and the femtocell base station currently connected to the mobile communication device is less than the communication alert value. Both the communication alert value and communication threshold value are preset signal strength parameters. Since the femtocell base stations are connected together through network cables, there exists a time delay in signal comparison between the femtocell base stations. Therefore, in a preferred embodiment, the signal capture time period is greater than the length of the time delay. Then, the process goes to step S3.

At step S3, the network device detects the signal strength of the femtocell base station currently connected to the mobile communication device, and performs a timing operation according to the signal capture time period when the signal strength of the femtocell base station currently connected to the mobile communication device is less than the communication alert value. In a preferred embodiment, the network device detects the signal strength of communication between the mobile communication device and the serving femtocell base station, and when the signal strength is less than the preset communication alert value, the process goes to step S4.

At step S4, when the timing operation of step S3 starts to operate, the network device continuously captures the signal strength of the femtocell base stations in the permission list that allow the mobile communication device to access thereto as well as the signal strength of the femtocell base station currently connected to the mobile communication device until the elapsed time measured through the timing operation reaches the signal capture time period. Then, the process goes to step S5.

At step S5, a priority list is created based on the continuously captured signal strength of the femtocell base stations within the signal capture time period. Then, the process goes to step S6.

At step S6, the network device compares the signal strength of the femtocell base stations. Then, the process goes to step S7.

At step S7, when the signal strength of the femtocell base station currently connected to the mobile communication device is less than that of the femtocell base station with highest priority in the priority list, the femtocell base station with highest priority is chosen as a target femtocell base station for handover of the mobile communication device. Since the mobile communication device is in the coverage of both the original femtocell base station and the target femtocell base station, before handover, the target femtocell base station can obtain the signal reference value of the original femtocell base station so as to faciliate the handover.

Further, in step S7, when the signal strength of the femtocell base station currently connected to the mobile communication device is greater than or equal to that of the femtocell base station with highest priority in the priority list, the mobile communication device maintains the connection with the original femtocell base station.

Further, at step S5, the network device can calculate the average signal strength of each of the femtocell base stations based on the continuously captured signal strength thereof so as to create the priority list according to the average signal strength of the femtocell base stations. As such, the network device compares the average signal strength of the femtocell base stations at step S6, and at step S7, the network device chooses the femtocell base station with highest priority in the priority list as the target femtocell base station for handover when the average signal strength of the femtocell base station currently connected to the mobile communication device is less than the femtocell base station with highest priority.

Therefore, when the signal strength of the femtocell base station currently connected to the mobile communication device is less than the preset communication alert value, the present invention compares the signal strength of the femtocell base station currently connected to the mobile communication device with other femtocell base stations that allow the mobile communication device to access thereto so as to choose the femtocell base station with highest signal strength or highest average signal strength as a handover target, thereby effectively overcoming the conventional handover difficulty due to inability to timely capture the signal reference values (signal strength) of other femtocell base stations.

The above-described descriptions of the detailed embodiments are intended to illustrate the preferred implementation according to the present invention but are not intended to limit the scope of the present invention. Accordingly, all modifications and variations completed by those with ordinary skill in the art should fall within the scope of present invention defined by the appended claims.

What is claimed is:

1. A method for processing communication service handover of a mobile communication device between femtocell base stations through a network device, comprising the steps of:

creating in the network device a permission list containing at least one of the femtocell base stations that allows the mobile communication device to access thereto in the coverage of the femtocell base stations and setting a communication alert value and a signal capture time period;

detecting by the network device signal strength of the femtocell base station currently connected to the mobile communication device, and when the detected signal strength is less than the communication alert value having the network device perform a timing operation according to the signal capture time period so as to continuously capture the signal strength of the femtocell base station currently connected to the mobile communication device and other femtocell base stations in the permission list until the elapsed time measured through the timing operation reaches the signal capture time period, and creating a priority list according to the signal strength of said other femtocell base stations; and when the signal strength of the femtocell base station currently connected to the mobile communication device is less than that of the femtocell base station with highest priority in the priority list having the network device choose the femtocell base station with highest priority as a target femtocell base station for handover of the mobile communication device.

2. The method of claim 1, further comprising the step of calculating average signal strength of each of the femtocell base stations in the permission list according to the captured signal strength thereof within the signal capture time period.

3. The method of claim 2, further comprising the step of comparing the average signal strength of the femtocell base station currently connected to the mobile communication device with those of the femtocell base stations in the priority list so as to choose the femtocell base station with highest priority as the target femtocell base station for handover of the mobile communication device when the average signal strength of the femtocell base station currently connected to the mobile communication device is less than that of the femtocell base station with highest priority.

4. The method of claim 2, further comprising the step of creating the priority list according to the average signal strength of said other femtocell base stations.

5. The method of claim 4, further comprising the step of comparing the average signal strength of the femtocell base station currently connected to the mobile communication device with those of the femtocell base stations in the priority list so as to choose the femtocell base station with highest priority as the target femtocell base station for handover of the mobile communication device when the average signal strength of the femtocell base station currently connected to the mobile communication device is less than that of the femtocell base station with highest priority.

6. A system for processing communication service handover of a mobile communication device between femtocell base stations through a network device, comprising:

a database for storing a permission list containing at least one of the femtocell base stations that allows the mobile communication device to access thereto within coverage of the femtocell base stations;

a setting module for setting a communication alert value and a signal capture time period;

a detection module for detecting signal strength of the femtocell base station currently connected to the mobile communication device, and performing a timing operation according to the signal capture time period when the detected signal strength is less than the communication alert value;

a capturing module for continuously capturing the signal strength of the femtocell base station currently connected to the mobile communication device and other femtocell base stations in the permission list until elapsed time measured through the timing operation reaches the signal capture time period and creating a priority list according to the signal strength of said other femtocell base stations; and a switching module for comparing the signal strength of the femtocell base station currently connected to the mobile communication device with those of the femtocell base stations in the priority list so as to choose the femtocell base station with highest priority as a target femtocell base station for handover of the mobile communication device when the signal strength of the femtocell base station currently connected to the mobile communication device is less than that of the femtocell base station with highest priority.

7. The system of claim 6, wherein the capturing module further comprises a calculating unit for calculating average signal strength of each of the femtocell base stations in the permission list according to the captured signal strength thereof within the signal capture time period.

8. The system of claim 7, wherein the switching module further comprises a comparison unit for comparing the average signal strength of the femtocell base station currently connected to the mobile communication device with those of the femtocell base stations in the priority list so as to choose the femtocell base station with highest priority as the target femtocell base station for handover of the mobile communication device when the average signal strength of the femtocell base station currently connected to the mobile communication device is less than that of the femtocell base station with highest priority.

9. The system of claim 7, wherein the capturing module creates the priority list according to the average signal strength of said other femtocell base stations.

10. The system of claim 9, wherein the switching module further comprises a comparison unit for comparing the average signal strength of the femtocell base station currently connected to the mobile communication device with those of the femtocell base stations in the priority list so as to choose the femtocell base station with highest priority as the target femtocell base station for handover of the mobile communication device when the average signal strength of the femtocell base station currently connected to the mobile communication device is less than that of the femtocell base station with highest priority.

* * * * *